United States Patent [19]

Beggs et al.

[11] 4,316,739
[45] Feb. 23, 1982

[54] METHOD FOR PRODUCING MOLTEN IRON

[75] Inventors: Donald Beggs, Charlotte, N.C.; John C. Scarlett, Toledo, Ohio

[73] Assignee: Midrex Corporation, Charlotte, N.C.

[21] Appl. No.: 181,024

[22] Filed: Aug. 25, 1980

Related U.S. Application Data

[62] Division of Ser. No. 57,932, Jul. 16, 1979, Pat. No. 4,235,425.

[51] Int. Cl.³ ............................................. C21B 13/14
[52] U.S. Cl. ........................................... 75/40; 75/38
[58] Field of Search ................................. 75/38, 40, 11

[56] References Cited

U.S. PATENT DOCUMENTS 3,236,628  2/1966  Von Bogdandy ...................... 75/38
4,076,954  2/1978  Linder ................................. 75/11

*Primary Examiner*—M. J. Andrews
*Attorney, Agent, or Firm*—Ralph H. Dougherty

[57] ABSTRACT

A method and apparatus for producing molten iron in which pulverized coal is gasified with oxygen in an iron melting chamber, iron pellets on an upstanding hearth in the melting chamber are exposed to the gasification heat and melted. Molten iron trickles down from the hearth to a surrounding liquid bath. Off-gases from the chamber are utilized for direct reduction of iron oxide pellets to produce hot reduced iron pellets which are melted in the chamber.

5 Claims, 1 Drawing Figure

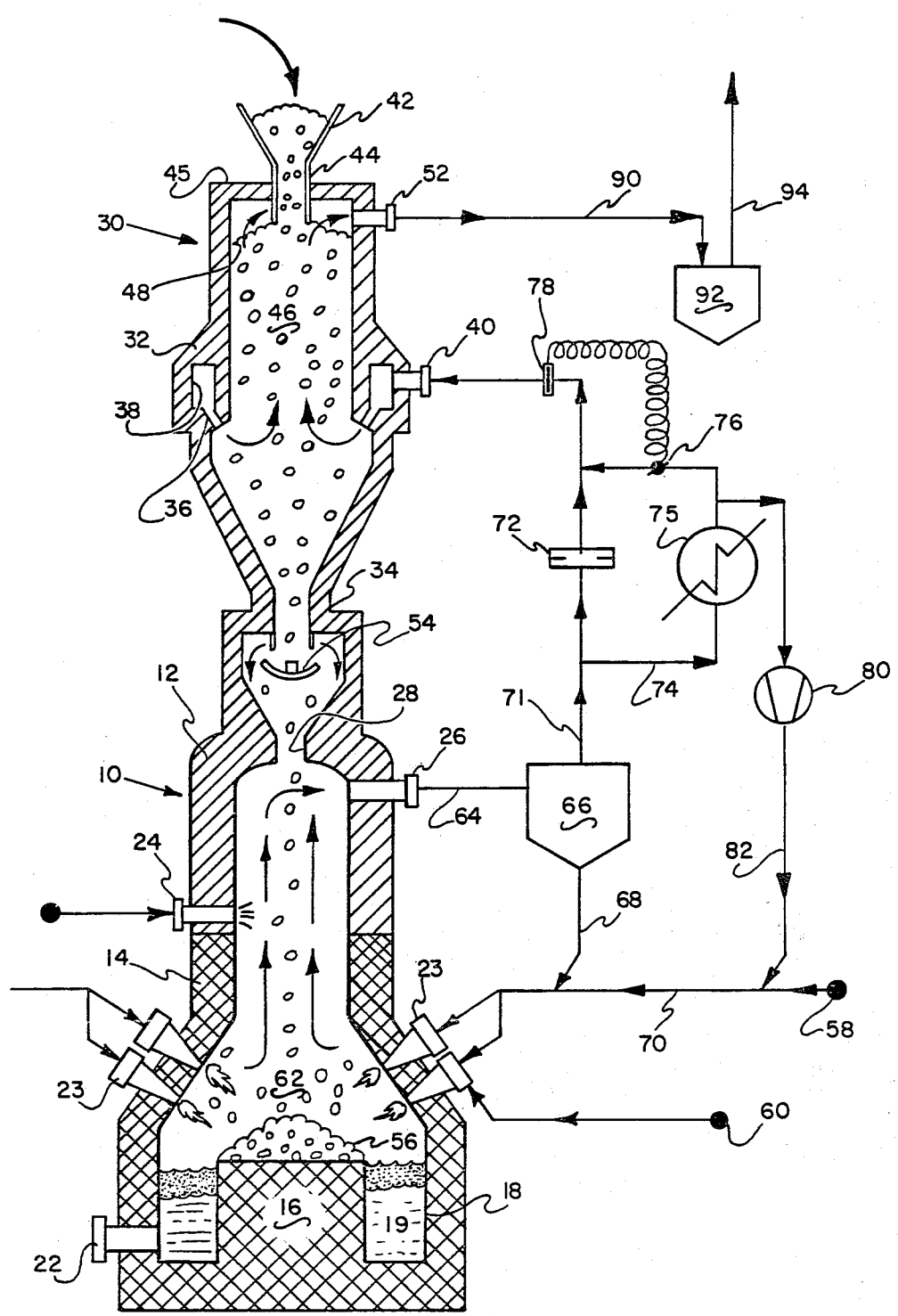

METHOD FOR PRODUCING MOLTEN IRON

This is a division, of application Ser. No. 57,932, filed Jul. 16, 1979, now U.S. Pat. No. 4,235,425.

For many years the primary route for worldwide steelmaking has been the combination of the coke oven and blast furnace for producing molten pig iron, followed by refining of the pig iron into steel, initially in the open hearth or Bessemer converter and more recently in the basic oxygen furnace (BOF). Although most of the world production of steel is still made by this route, steelmakers are facing increasing problems in adding steelmaking capacity due to such factors as the large capital investments required for coke oven-blast furnace-BOF complexes, the need for ever more expensive coking coals and the environmental problems associated with coke ovens.

The present invention relates to a new and simplified process for producing molten pig iron without need for coking coal or the costly, complex and environmentally objectionable coke ovens. In the present invention, lower grade non-coking coal is gasified at high temperature with oxygen in a gasifier-melter chamber which serves the dual function of gasifying pulverized coal and melting reduced iron pellets and slag formed from gangue in the pellets and ash from the coal. The hot off-gas from the gasifier-melter chamber is then utilized to reduce iron oxide pellets or lump ores to hot direct reduced iron in a direct reduction shaft type furnace which is directly coupled to the gasifier-melter. The off-gas from the direct reduction furnace is cooled and scrubbed of dust and is available as clean export fuel gas, suitable for example, for use in a steel mill for billet or slab reheating. Of the fuel value of the coal, which is gasified for the process, approximately 50 percent is available as export fuel gas from the process.

OBJECTS OF THE INVENTION

It is the principal object of this invention to provide a process for producing molten pig iron from iron oxide pellets utilizing pulverized low grade coal rather than coke for carrying out the process.

It is another object of the invention to provide means for catalyzing the gasification of coal by impacting the gasification reactants on a bed of reduced iron pellets being melted.

It is another object of the invention to provide for export fuel gas from the coal used in the process.

It is also an object of this invention to provide apparatus for carrying out the process.

BRIEF DESCRIPTION OF THE DRAWING

The present invention will be more readily understood by referring to the following detailed specification and the appended drawing in which:

The single FIGURE is a schematic cross section of an elevational view of the gasifier-melter and direct reduction furnace together with related equipment in accordance with the present invention.

DETAILED DESCRIPTION

Referring now to the drawing, a gasifier-melter chamber 10 having a steel shell is lined with firebrick type refractory 12 in the upper region and carbon brick type refractory 14 in the lower region. The chamber 10 preferably has a generally circular cross-section. An elevated melting hearth 16 may be provided in the bottom region of the chamber. This hearth is situated within the chamber to form a molten iron and slag reservoir 18 for accumulating molten iron 19 and slag 20. An iron and slag notch 22 is provided for periodically withdrawing hot liquid from the reservoir 18. The hearth 16 is preferably a centrally situated upstanding pedestal surrounded by an annular molten metal pool 18. Alternatively, the hearth may be formed by a pile of pellets or other material on the furnace bottom.

A plurality of water cooled tuyeres 23 are positioned in a wall of the chamber and are inclined downwardly toward the upper region of melting hearth 16. The upper region of the chamber is provided with a water atomizing nozzle 24 arranged to spray water into the chamber. A gas outlet pipe 26 and a hot reduced iron pellet inlet opening 28 are situated at the top of the chamber.

A shaft-type direct reduction furnace 30 having a steel shell and a firebrick type refractory lining 32 is coupled to the upper region of gasifier-melter chamber 10. Furnace 30 is generally cylindrical in the upper region and converging in the lower region to a hot reduced iron pellet discharge pipe 34. The middle region of furnace 30 is equipped with a plurality of hot reducing gas inlet ports 36 arranged around the furnace periphery. The ports 36 communicate with a gas distribution plenum 38 within the furnace refractory wall and extending around the furnace. Hot reducing gas is admitted through inlet pipe 40 to the plenum 38 and to the ports 36.

An iron oxide pellet charge hopper 42 atop furnace 30 feeds a pellet inlet pipe 44 which extends into the furnace below the roof 45. Pellets from pipe 44 form a burden 46 in the furnace having a natural angle of repose stockline 48. The pellets can be either conventional iron oxide pellets, or lumps of natural iron ore, or a mixture thereof. The space between the stockline 48 and the furnace roof 45 forms a reacted gas plenum from which furnace off-gas is removed through gas outlet pipe 52.

Hot reduced iron pellets are withdrawn from furnace discharge pipe 34 at a controlled rate by a discharge feeder 54 to establish gravity descent of furnace burden 46. The discharge feeder 54 can be any conventional type hot discharge feeder such as a heat resisting alloy reciprocating wiper bar or apron feeder. The hot reduced iron pellets discharged by feeder 54 fall by gravity onto hearth 16 where a natural angle of repose pile 56 is formed. A small amount of lump coke may be added to the oxide pellet feed in charge hopper 42 to provide a sacrificial source of fixed carbon intermixed with the hot direct reduced iron melted on the impact bed hearth. The coke will travel through the reduction furnace 30 without reacting. When it impinges upon the bottom of the furnace which need not be an elevated pedestal in this case, it will form an upstanding impact bed hearth along with the iron pellets. The coke will insure a carbon-rich environment at the location where melting occurs.

Pulverized coal to be gasified in gasifier-melter chamber 10 is admitted to tuyeres 23 from a pulverized coal source 58 and oxygen for gasifying is admitted to tuyeres 23 from an oxygen source 60. The tuyeres are directed to impinge on the surface of the pile 56 of hot direct reduced iron pellets on hearth 16. This impingement serves not only to accelerate the gasification combustion but also to accelerate the melting of the pellets. As the pellets melt, superheated molten iron and slag continuously trickle over the edge of hearth 16 and down into the annular molten iron and slag reservoir 18. Molten iron and slag are periodically tapped through iron notch 22. As the pellets in pile 56 melt, causing the pile to shrink in size, a nuclear level sensing probe, not shown, serves to actuate the reduction furnace discharge feeder 54 to replace melted pellets with hot reduced iron pellets from reduction furnace 30.

Gasifier-melter gas, leaving the melting region and prior to partial cooling by water spray 24, is indicated generally at region 62. Hot gas leaving chamber 10 via outlet pipe 26 flows via pipe 64 to a hot gas cyclone 66 which removes solids consisting of ash, iron dust and any unreacted coal char from the gas. The solids extracted from the gas in the cone of cyclone 66 are fed back into the tuyeres 23 through pipe 68 and pulverized coal feed pipe 70.

The major portion of the hot gas leaving the top of cyclone 66 is admitted to reduction furnace 30 via inlet pipe 40. The temperature of the gas leaving cyclone 66 is normally too high for proper operation of reduction furnace 30. In order to achieve a controlled lower gas temperature at inlet pipe 40, the gas leaving cyclone 66 in pipe 71 flows through a restrictive flow orifice 72 which causes a portion of the gas to flow through a by-pass pipe 74 including a by-pass cooler 75 which is preferably a direct water contact cooler such as a packed tower, although an indirect type cooler could be used. To regulate the amount of hot gas from pipe 71 which passes through by-pass cooler 75, a flow control valve 76, which is responsive to a gas temperature sensing element 78 by conventional control means not shown, is provided which serves to control the temperature of the gas entering inlet pipe 40.

A minor portion of the hot gas leaving cyclone 66, after being cooled in cooler 75, is compressed in a gas compressor 80 and utilized via pipe 82 and pipe 70 to convey pulverized coal from source 60 and cyclone solids from pipe 68 to tuyeres 23.

The off-gas is removed from reduction furnace 30 through gas outlet 52 and pipe 90 to a gas scrubber-cooler 92 which can be of conventional type such as a water injection venturi scrubber followed by a packed tower direct water contact cooler. The scrubbed and cooled gas leaves scrubber-cooler 92 through export fuel pipe 94. The gas in pipe 94 is useful as a fuel gas in, for example, billet or slab reheat furnaces in a steel mill adjacent to the gasifier-melter facility, or for other fuel gas consuming equipment.

To provide for a nominal molten slag fluidity and iron desulfurizer, such as is utilized in a conventional blast furnace, lump limestone or dolomite is preferably fed to the process along with iron oxide pellets into reduction furnace charge hopper 42. As an alternative method, pulverized limestone or dolomite could be injected through tuyeres 23.

As a specific example of the operation of the gasifier-melter of the present invention, a process analysis has been made which is summarized in Tables I through III. The analysis is based on a typical Western U.S.A. sub-bituminous coal as the carbonaceous material which is gasified. The tables give the flow, feed and energy requirements to produce 1.0 metric tons of molten iron product.

Reducing gas quality is defined as the ratio of reductants (CO plus $H_2$) to oxidants ($CO_2$ plus $H_2O$) in the gas mixture. In order to take full advantage of the inherent chemical efficiency of a counterflow shaft reduction furnace, the quality of the hot reducing gas introduced to reduction furnace 30 should be at least about 8.

Operation temperatures in the reduction furnace vary between 760° and 900° C., and depend on the specific particulate iron oxide material being reduced. A practical direct reduction operating temperature for most iron oxide materials is 815° C.

TABLE I

GAS FLOWS AND TEMPERATURES

| ITEM | REFERENCE NUMERAL | FLOW IN Nm³* | GAS QUALITY | GAS TEMPERATURE °C. |
|---|---|---|---|---|
| Oxygen | 60 | 576 | — | 50 |
| Melter/Gasifier gas | 62 | 1869 | 16.9 | 1400 |
| Humidified Melter/Gasifier gas | 64 | 2014 | 8.0 | 1200 |
| By-passed gas | 74 | 741 | 8.0 | 60 |
| Reducing gas | 40 | 1983 | 8.0 | 815 |
| Furnace off gas | 90 | 1983 | 1.4 | — |
| Clean off gas fuel | 94 | 1850 | — | 60 |

*Nm³ - normal cubic meters

TABLE II

FEED AND ENERGY REQUIREMENTS

| ITEM | REFERENCE NUMERAL | Nm³ | kg | Gcal |
|---|---|---|---|---|
| Coal | 58 | — | 1055 | 6.71 (HHV) |
| Oxygen | 60 | 576 | — | 1.01* |
| Oxide | — | — | 1420 | — |
| Humidifying water | 24 | — | 117 | — |
| Off gas fuel | 94 | 1850 | — | (3.47) |
| Net energy required | — | — | — | 4.25 |

*Energy (HHV) of coal required to produce 576 Nm³$O_2$ at 30% efficiency.

Because of the chemical thermodynamics involved in the reduction of iron oxide to metallic iron, only a portion of the initial reductants (CO plus $H_2$) can be reacted before the oxidants ($CO_2$ plus $H_2O$) which are formed cause the reduction reactions to cease. This thermodynamic situation results in the spent reducing gas leaving the reduction furnace 30 through outlet 52 having a quality of about 1.5 for an efficiently operating furnace. Therefore, reducing gas with a quality of 8 is oxidized to a quality of 1.5 in the reduction process. The amount of CO plus $H_2$ thus consumed determines the quantity of reducing gas required. A reducing gas quantity of 1800 to 2100 Nm³/t of reduced iron product is practical for efficient operation.

Each ton of molten iron product discharged from the gasifier-melter 10 requires that 1.035 tons of direct reduced iron pellets be charged into the gasifier-melter. Typical metallization of direct reduced iron pellets is 92%. Pellets are delivered to the gasifier-melter at 700° C. Molten iron product is discharged at 1350° C.

Therefore, sufficient heat must be generated in the melter-gasifier to heat the 700° C. incoming direct reduced iron pellets to 1350° C., reduce residual FeO to iron, reduce $SiO_2$, MnO, $P_2O_5$, etc., increase carbon, heat slag materials to 1350° C., and satisfy heat losses from the system. This requires 403,000 Kcal/t of molten iron product. The heat required is furnished by the exothermic reaction of coal and oxygen within the gasifier-melter and cooling the products of combustion to 1400° C. at region 62 in the gasifier-melter.

TABLE III

GAS ANALYSES THROUGHOUT PROCESS

| ITEM | REFERENCE NUMERAL | % CO | % $CO_2$ | % $H_2$ | % $H_2O$ | % $N_2$ |
|---|---|---|---|---|---|---|
| Melter Gasifier gas | 62 | 66.9 | 2.3 | 26.2 | 3.2 | 1.4 |
| Reducing gas | 40 | 63.0 | 2.2 | 24.7 | 8.8 | 1.3 |
| Furnace off gas | 90 | 36.6 | 28.1 | 21.7 | 12.3 | 1.3 |
| Clean off gas fuel | 94 | 38.8 | 29.8 | 23.0 | 6.0 | 2.4 |

SUMMARY

It can readily be seen from the foregoing that the objectives of this invention have been achieved in that the process of the present invention is a totally counterflow continuous process which efficiently utilizes pulverized low grade coal as fuel to produce molten iron from particulate iron oxide and, at the same time, produces valuable export gaseous fuel.

What is claimed is:

1. A method for reducing particulate iron oxide and producing molten iron comprising:
   (a) reducing particulate iron oxide to solid particulate metallized iron product in a shaft type reduction furnace;
   (b) discharging said reduced metallized particulate product into a gasifier-melter vessel to form a generally central upstanding impact bed hearth of product surrounded by a molten metal pool;
   (c) directing sufficient heat onto said impact bed hearth to melt any metallized product thereon and to form a hot gas, whereby molten iron and slag flow from said hearth to said molten metal pool;
   (d) humidifying the hot gas within said gasifier-melter by introducing water to said vessel above the elevation of said impact bed hearth;
   (e) removing said hot gas from the gasifier-melter, removing particulate matter from said gas;
   (f) introducing at least part of the hot gas into the gasifier-melter as hot blast gas directed toward said impact bed hearth to melt said product; and
   (g) drawing off the molten iron product.

2. A method according to claim 1 further comprising introducing carbonaceous material to said gasifier-melter vessel to form a portion of said upstanding impact bed hearth.

3. A method according to claim 1 further comprising introducing a portion of said hot gas into said reduction furnace as reductant to reduce the iron oxide therein.

4. A method according to claim 3 further comprising reducing the temperature of said hot gas prior to introduction of said gas into said reduction furnace as reductant.

5. A method according to claim 3 wherein said reductant reacts with said particulate iron oxide to form a spent top gas, said method further comprising withdrawing said spent top gas from said furnace, cooling said gas and removing particulate matter therefrom to form an export fuel gas.

* * * * *